US010960338B2

(12) United States Patent
Colwell et al.

(10) Patent No.: US 10,960,338 B2
(45) Date of Patent: Mar. 30, 2021

(54) AIR FILTRATION FOR A MOBILE MINING MACHINE

(71) Applicant: Joy Global Surface Mining Inc, Milwuakee, WI (US)

(72) Inventors: Joseph Colwell, Hubertus, WI (US); Lucas Michael Connelly, Milwaukee, WI (US); Jake Swan, Milwaukee, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 254 days.

(21) Appl. No.: 15/969,381

(22) Filed: May 2, 2018

(65) Prior Publication Data

US 2018/0318743 A1    Nov. 8, 2018

Related U.S. Application Data

(60) Provisional application No. 62/500,460, filed on May 2, 2017.

(51) Int. Cl.
*B01D 46/00* (2006.01)
*B60H 1/00* (2006.01)
(Continued)

(52) U.S. Cl.
CPC ....... *B01D 46/0068* (2013.01); *B01D 46/002* (2013.01); *B01D 46/0043* (2013.01); *B01D 46/2411* (2013.01); *B01D 46/44* (2013.01); *B60H 1/00378* (2013.01); *B60H 3/0633* (2013.01); *B60H 3/0641* (2013.01); *B01D 2279/40* (2013.01); *B01D 2279/60* (2013.01)

(58) Field of Classification Search
CPC .............. B01D 46/0068; B01D 46/002; B01D 46/0043; B01D 46/2411; B01D 46/44; B01D 2279/40; B01D 2279/60; B60H 1/00378; B60H 3/0633; B60H 3/0641
See application file for complete search history.

(56) References Cited

U.S. PATENT DOCUMENTS

| 2,484,685 A | 10/1949 | Burdick et al. |
| 4,531,784 A | 7/1985 | Karlovsky |

(Continued)

FOREIGN PATENT DOCUMENTS

| CN | 203829805 | 9/2014 | |
| CN | 106049595 A | * 10/2016 | ............... E02F 9/16 |
| WO | WO 8203114 A | * 9/1982 | ............... B01L 1/04 |

OTHER PUBLICATIONS

Vac-u-max "Pipe and Tubing Central Vacuum Systems Installation Best Practices," Apr. 8, 2014, VAC-U-MAX, p. 1 (Year: 2014).*

(Continued)

*Primary Examiner* — Robert Clemente
(74) *Attorney, Agent, or Firm* — Michael Best & Friedrich LLP (57) ABSTRACT

A mobile mining machine includes a base, a main housing supported on the base, and an air filtration unit configured to provide filtered air to the main housing. The air filtration unit includes a dirty air inlet, a filtered air outlet, and a filter chamber disposed fluidly between the dirty air inlet and the filtered air outlet, the filter chamber housing a filter element. The dirty air inlet is positioned vertically below the filter chamber.

17 Claims, 13 Drawing Sheets

(51) Int. Cl.
    *B01D 46/24*         (2006.01)
    *B01D 46/44*         (2006.01)
    *B60H 3/06*         (2006.01)

(56) References Cited

U.S. PATENT DOCUMENTS

| | | | |
|---|---|---|---|
| 5,943,733 A * | 8/1999 | Tagliaferri | E01H 1/0854 |
| | | | 15/340.4 |
| 6,296,436 B1 * | 10/2001 | Ramun | E02F 9/18 |
| | | | 212/195 |
| 9,770,682 B2 * | 9/2017 | Massey | B01D 46/00 |
| 2014/0223690 A1 * | 8/2014 | Witter | A47L 9/20 |
| | | | 15/353 |
| 2017/0097085 A1 | 4/2017 | Fischer et al. | |
| 2019/0091619 A1 * | 3/2019 | Huang | B01D 46/02 |

OTHER PUBLICATIONS

YouTube video clip entitled "P&H AirScrubPro," uploaded on Aug. 29, 2012 by user "P&H Mining Equipment". Retrieved from Internet: https://www.youtube.com/watch?v=lhlnuicGall (Year: 2012).*

Vac-u-max "Pipe and Tubing Central Vacuum Systems Installation Best Practices," Apr. 8, 2014, VAC-U-MAX, p. 1 (Year: 2014) (Year: 2014).*

Caterpillar "7495 Electric Rope Shovel" Brochure/Literature, dated May 2016 (32 pages).

JOYGLOBAL P & H "Air Scrub Pro Filtration System" Data Sheet, dated Jul. 2013 (1 page).

P&H MinePro Services, "Sistema de Filtracion P&H AirScrubPro", 2019 (24 pages including statement of relevance).

Chilean Patent Office Action for Application No. 201801186 dated May 20, 2019 (12 pages including statement of relevance).

* cited by examiner

AIR FILTRATION FOR A MOBILE MINING MACHINE

CROSS-REFERENCE TO RELATED APPLICATIONS

This application claims priority to U.S. Provisional Patent Application No. 62/500,460 filed on May 2, 2017, the entire content of which is incorporated herein by reference.

BACKGROUND

The present invention relates to an air filtration assembly. Specifically, the present invention relates to an air filtration assembly for a mobile mining machine, such as a mining shovel, electrically-driven blast hole drill, mobile mining crusher, dragline, and the like.

SUMMARY

The invention provides, in one aspect, a mobile mining machine including a base, a main housing supported on the base, and an air filtration unit configured to provide filtered air to the main housing. The air filtration unit includes a dirty air inlet, a filtered air outlet, and a filter chamber disposed fluidly between the dirty air inlet and the filtered air outlet, the filter chamber housing a filter element. The dirty air inlet is positioned vertically below the filter chamber.

The invention provides, in another aspect, a method of operating an air filtration unit for a mobile mining machine. The method includes drawing air into the air filtration unit through a dirty air inlet, capturing dirt from the air on a filter element, expelling filtered air through a filtered air outlet, and discharging at least a portion of the dirt captured on the filter element through the dirty air inlet.

The invention provides, in another aspect, a method of regulating an air temperature within a housing of a mobile mining machine. The method includes supplying filtered, ambient air into a first compartment of the housing with a first air filtration unit, supplying filtered, ambient air into a second compartment of the housing at least partially separated from the first compartment with a second air filtration unit, and varying power supplied to a blower of the second air filtration unit independently of the first air filtration unit to maintain a target temperature within the second compartment.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
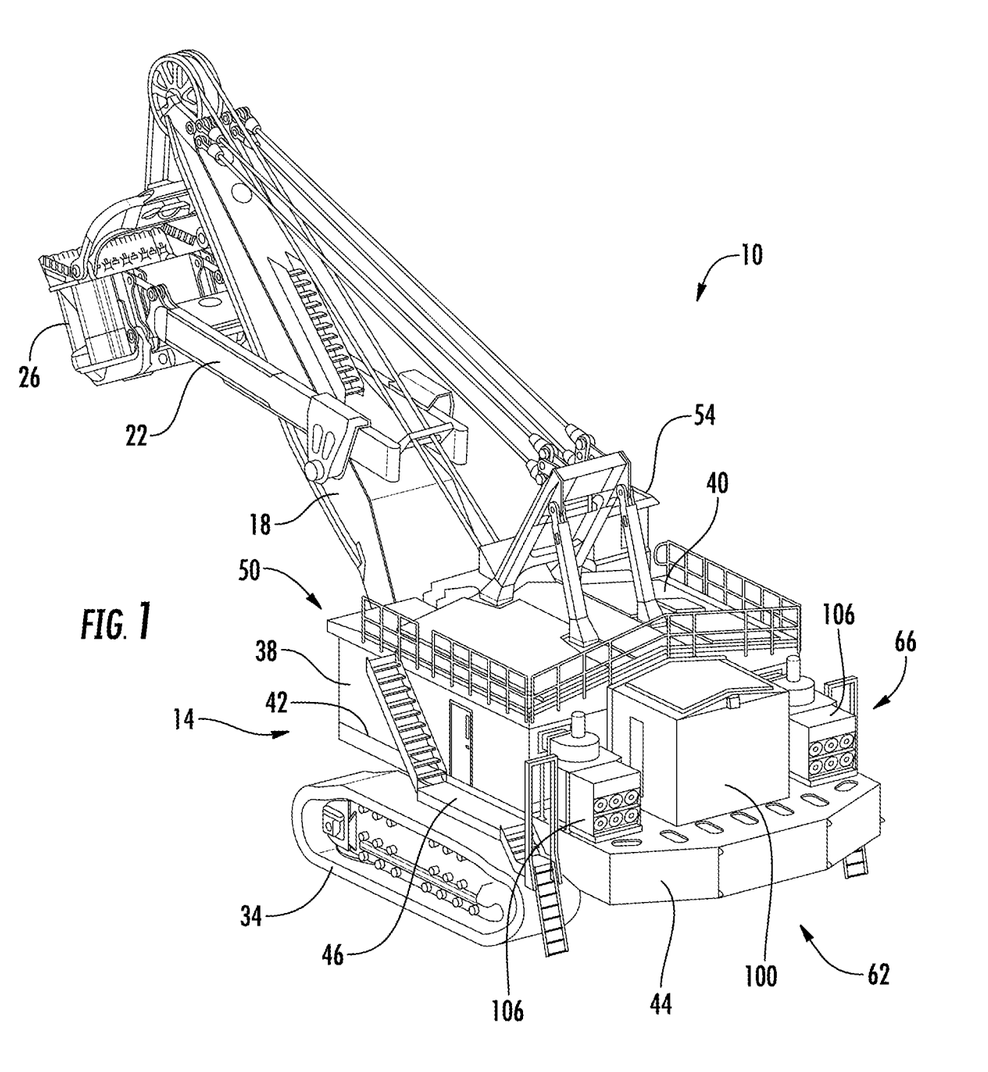
FIG. 1 is as perspective view of a mobile mining machine according to an embodiment of the invention.

With reference to FIG. 1, a mobile mining machine, which is an electrically-driven mining shovel 10 in the illustrated embodiment, includes a base 14, a boom 18, a first member or handle 22, and a bucket 26. The boom 18 is coupled to the base 14, the handle 22 is coupled to the boom 18, and the bucket 26 is coupled to the handle 22. In the illustrated embodiment, the base 14 is supported on crawler tracks 34. In addition, the base 14 is rotatable with respect to the crawler tracks 34. The mining shovel 10 further includes a main housing 38 coupled to and supported on the base 14. The main housing 38 includes a roof 40. The base 14 defines a deck 42 upon which the main housing 38 is positioned. The illustrated deck 42 includes walkways 46 for human operators to move about the deck 42, a platform 43 (FIG. 2) enclosed by the main housing 38, and a counterweight box 44.

With continued reference to FIG. 1, in the illustrated embodiment, the boom 18, the handle 22, and the bucket 26 are coupled to the base 14 at a first end 50 of the base 14. An operator's station 54 (e.g., an operator cab) is positioned proximate the first end 50 of the base 14. The counterweight box 44 is defined at a second end 62 opposite the first end 50. In some embodiments, the counterweight box 44 may be filled with suitable counterweight material in order to offset the weight of material collected in the bucket 26.

The mining shovel 10 further includes an air filtration assembly 66, positioned on a rear side of the main housing 38, proximate the counterweight box 44. The illustrated air filtration assembly 66 is coupled to the deck 42 and is not supported on the roof 40 of the main housing 38. The main housing 38 houses electrical motors, drives, electronics, gear cases, and other components that require cooling with filtered air. The air filtration assembly 66 is configured to provide filtered air to the main housing 38, and the filtered air may be used in cooling these components.

Figure 2:
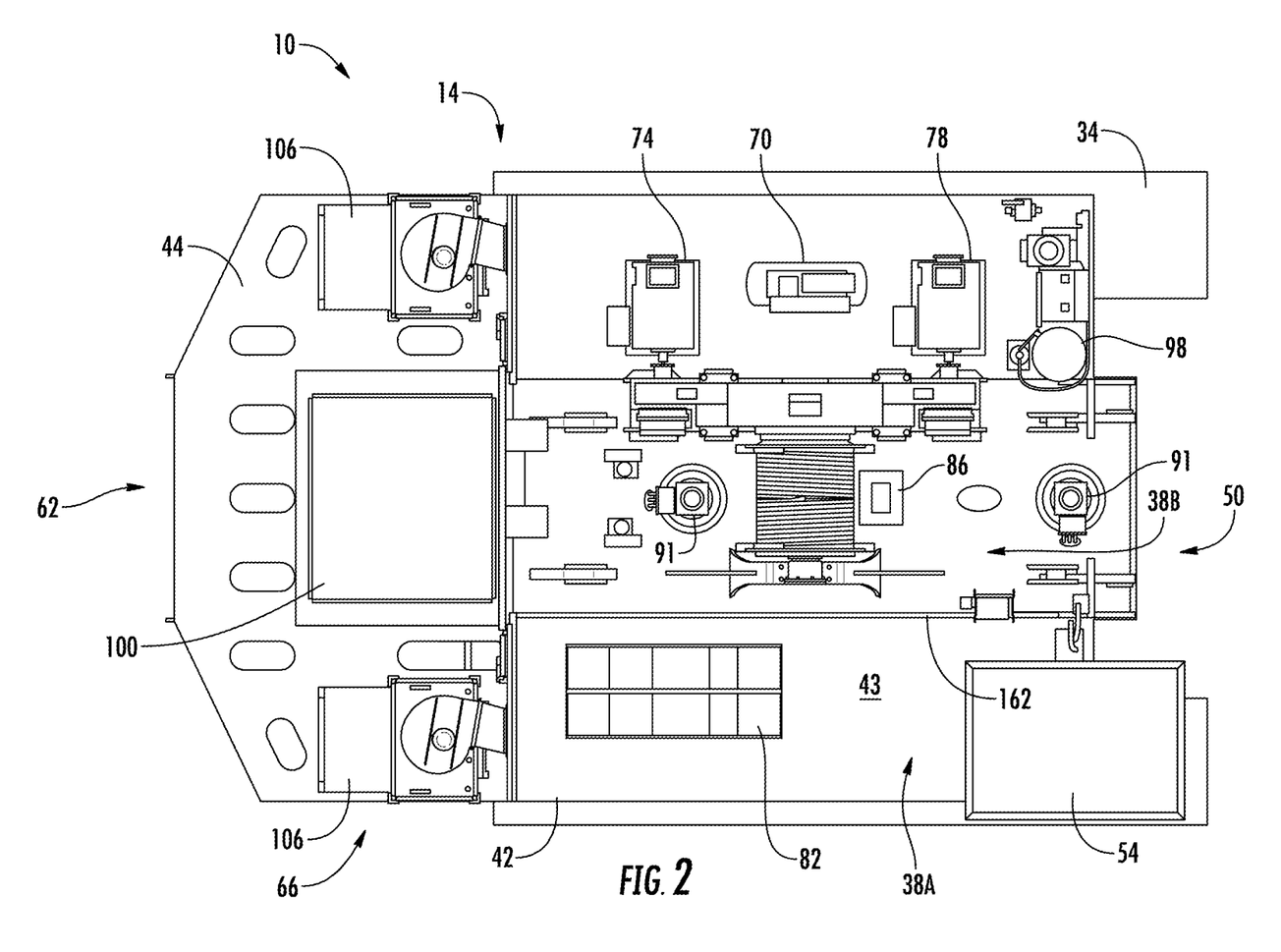
FIG. 2 is a top view of the mobile mining machine of FIG. 1, with a main housing of the mobile mining machine and other components hidden for clarity.

With reference to FIG. 2, the main housing 38 at least partially encloses, among other things, an air compressor 70, a first hoist motor 74, a second hoist motor 78, an electric drive 82, a collector 86, two swing transmissions 91, and a lubricant tank 98. In addition to providing filtered air for cooling purposes, the air filtration assembly 66 may also be used to maintain positive pressure within the main housing 38. In particular, forced air blowers (not shown) may be utilized to blow air onto the hoist motors 74, 78, the electric drive 82, etc., and these forced air blowers may draw air from within the main housing 38. If positive air pressure were not maintained within the main housing 38, a vacuum could be created that would tend to draw dust and debris into the main housing 38. By providing a source of pressurized filtered air, the air filtration assembly 66 advantageously prevents a vacuum from being formed in the main housing 38.

Figure 3:
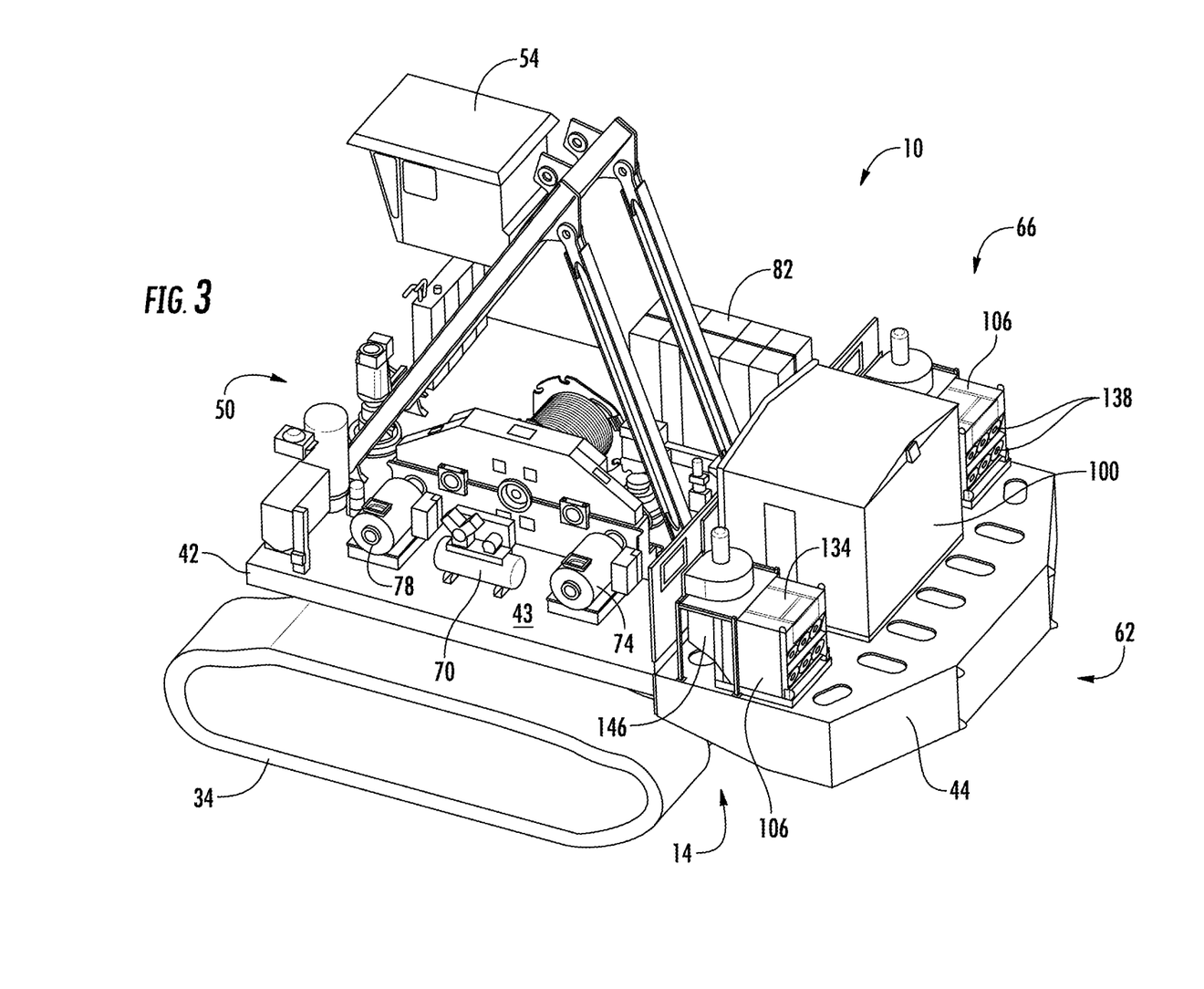
FIG. 3 is a partial perspective view of the mobile mining machine of FIG. 1, with various components hidden for clarity.

Referring to FIGS. 1-3, the illustrated air filtration assembly 66 includes two air filtration units 106 that are coupled to the deck 42 and positioned on the counterweight box 44. The air filtration units 106 are disposed on opposite lateral sides of an electrical room 100, which may contain one or more transformers or other electrical components of the mining shovel 10. In alternative embodiments, the air filtration assembly 66 may include one, two, or greater than two air filtration units 106.

Figure 4:
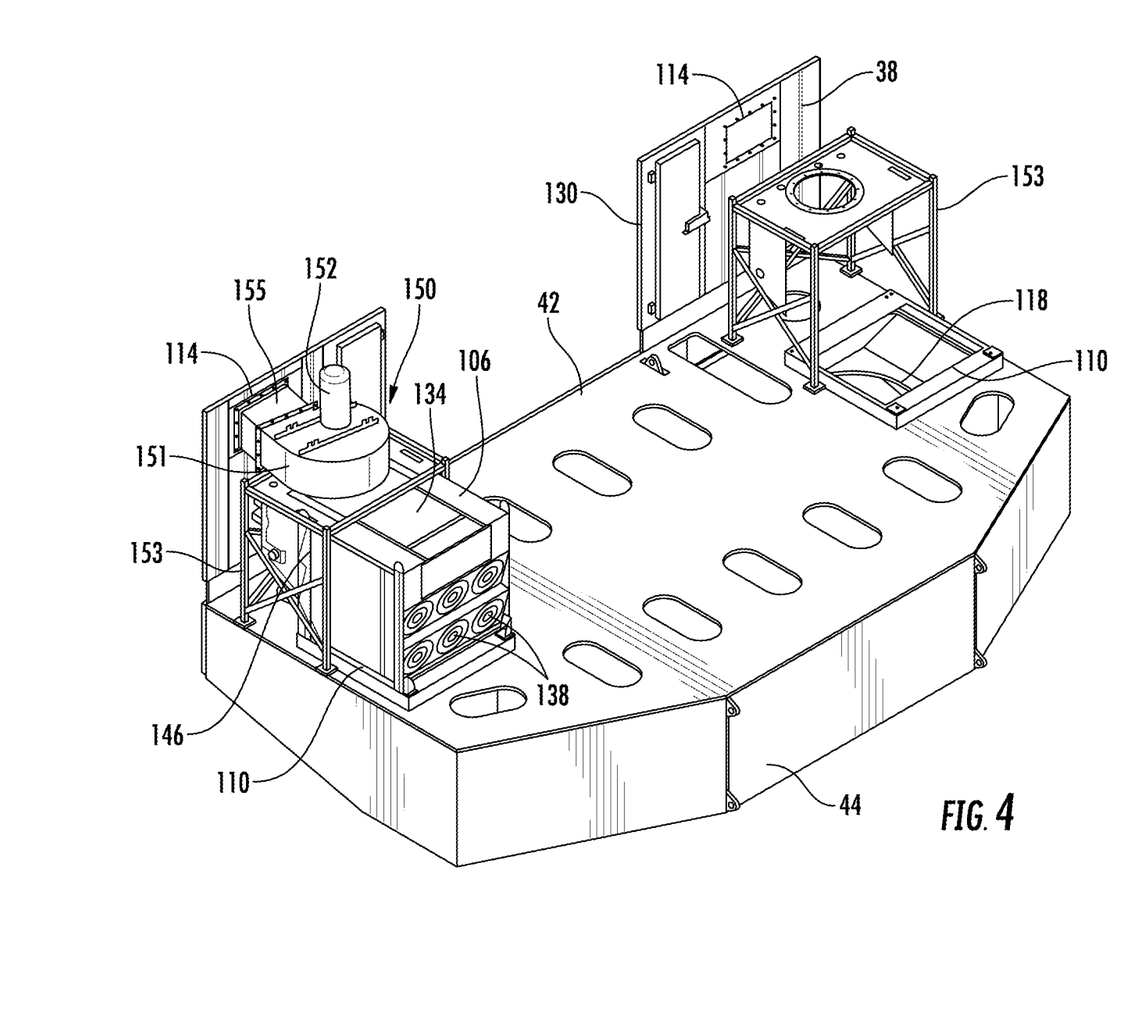
FIG. 4 is a partial perspective view of the mobile mining machine of FIG. 1 illustrating an air filtration assembly, with various components hidden for clarity.

Best illustrated in FIG. 4, each air filtration unit 106 includes a dirty air inlet 110 and a filtered air outlet 114. The dirty air inlet 110 is coupled to the deck 42 and is in fluid communication with a passageway or opening 118 that extends through the counterweight box 44 of the deck 42. In the illustrated embodiment, the opening 118 extends vertically through the counterweight box 44. As such, each air filtration unit 106 is configured to draw in air from below the deck 42. The deck 42 inhibits rain or water from entering the dirty air inlet 110, advantageously eliminating the need for a separate roof over the dirty air inlet 110. The filtered air outlet 114 is coupled to a rear wall 130 of the main housing 38. In some embodiments, the main housing 38 is extended to at least partially enclose the air filtration units 106. In further embodiments, the air filtration units 106 are positioned on the platform 43 within the main housing 38, spaced from the counterweight box 44. In such embodiments, the dirty air inlet would fluidly communicate with the environment through an opening formed in the platform 43.

With reference to FIGS. 7-10, the opening 118 in the deck 42 includes a first cross-sectional area 122 (FIGS. 7 and 8) at the top side of the deck 42 and a second cross-sectional area 126 (FIGS. 9 and 10) larger than the first cross-sectional area 122 at the bottom side of the deck 42. The first cross-sectional area 122 is positioned closer to the dirty air inlet 110 of the corresponding air filtration unit 106 than the second cross-sectional area 126. In this way, dirt laden air drawn in through the opening 118 accelerates as the dirty air moves toward the dirty air inlet 110 of the air filtration unit 106. Because the bottom of the opening 118 has a larger cross-sectional area 126, dirty air may be drawn into the opening 118 at a relatively low velocity, which may prevent large debris particles from becoming entrained within the air flow.

Figure 5:
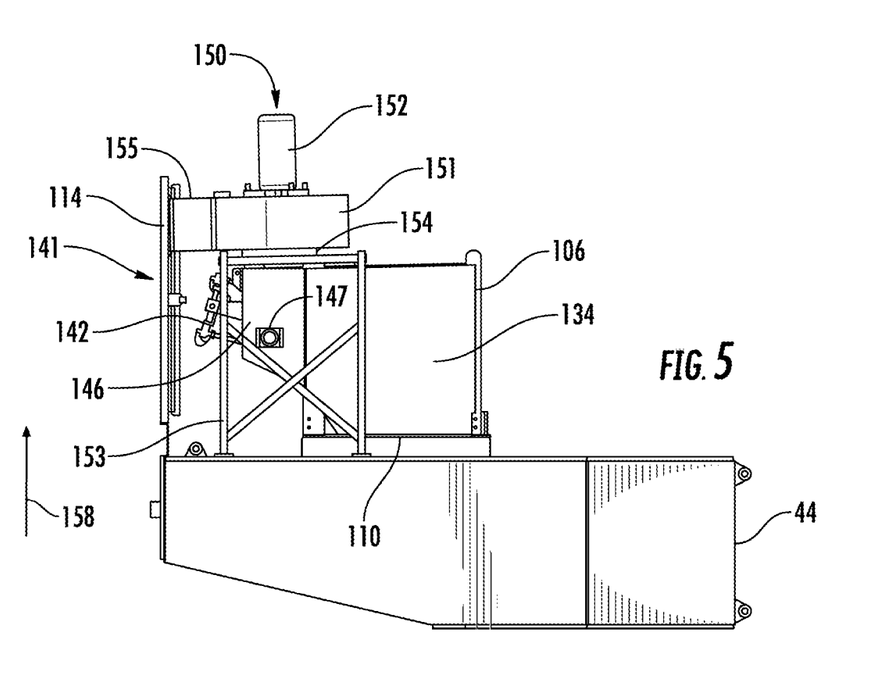
FIG. 5 is a side view of the air filtration assembly of FIG. 4.
Figure 6:
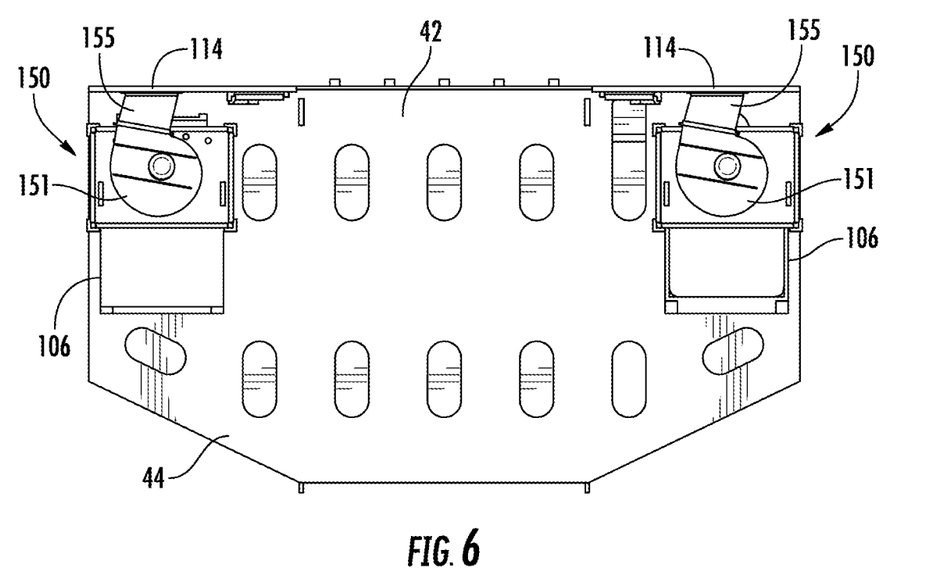
FIG. 6 is a top view of the air filtration assembly of FIG. 4.
Figure 7:
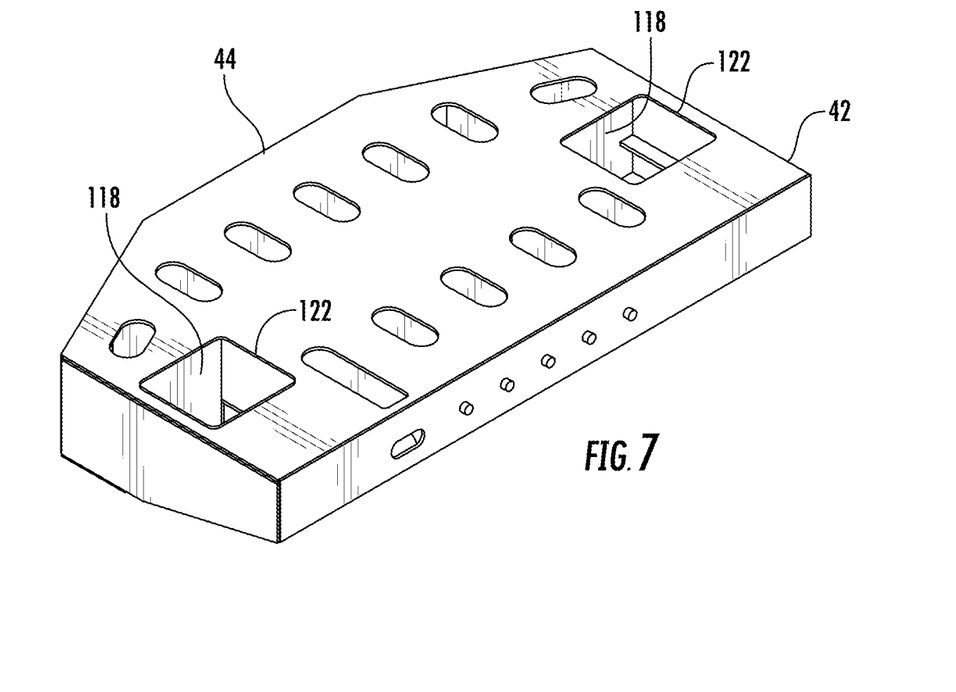
FIG. 7 is a top perspective view of a counterweight box of the mobile mining machine of FIG. 1.
Figure 8:
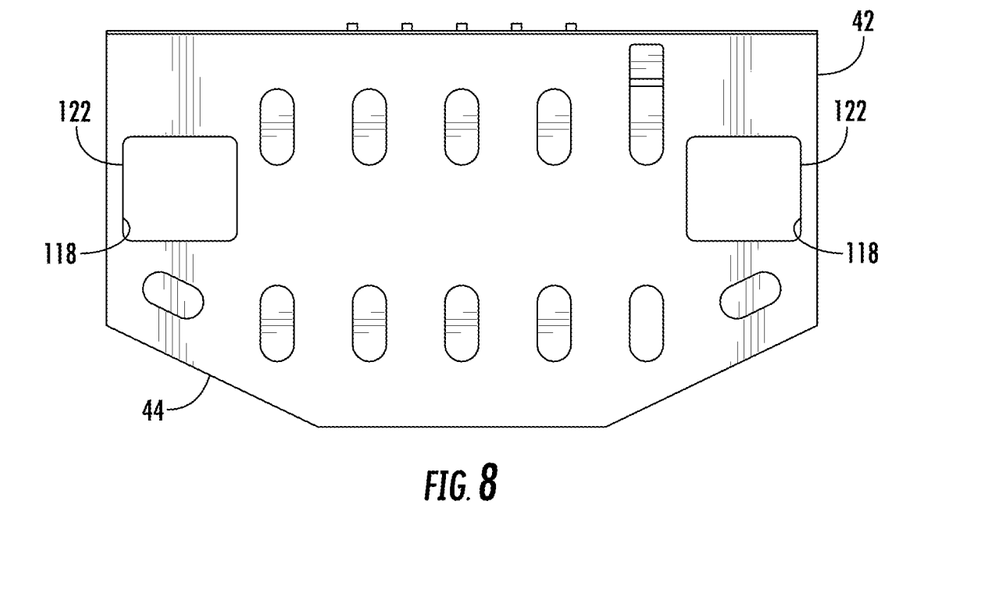
FIG. 8 is a top view of the counterweight box of FIG. 7.
Figure 9:
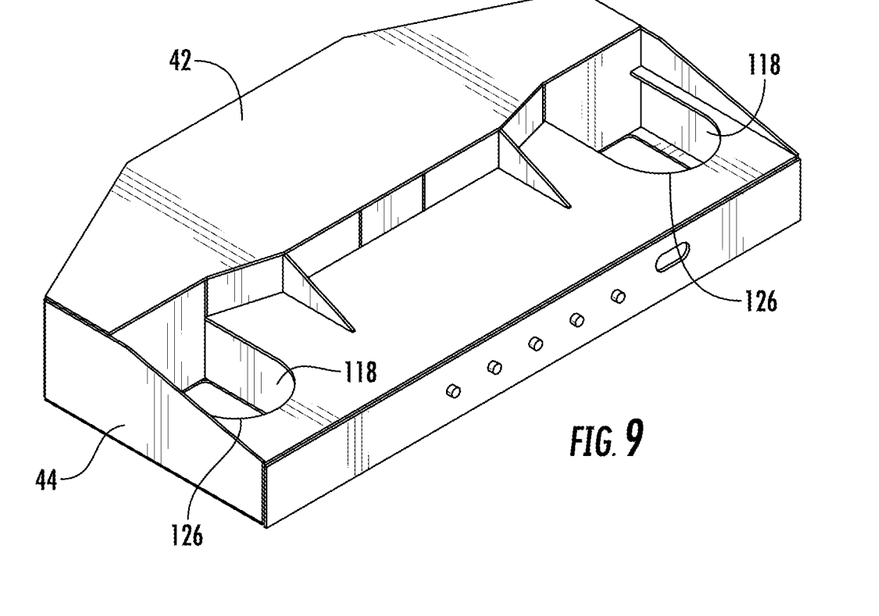
FIG. 9 is a bottom perspective view of the counterweight box of FIG. 7.
Figure 10:
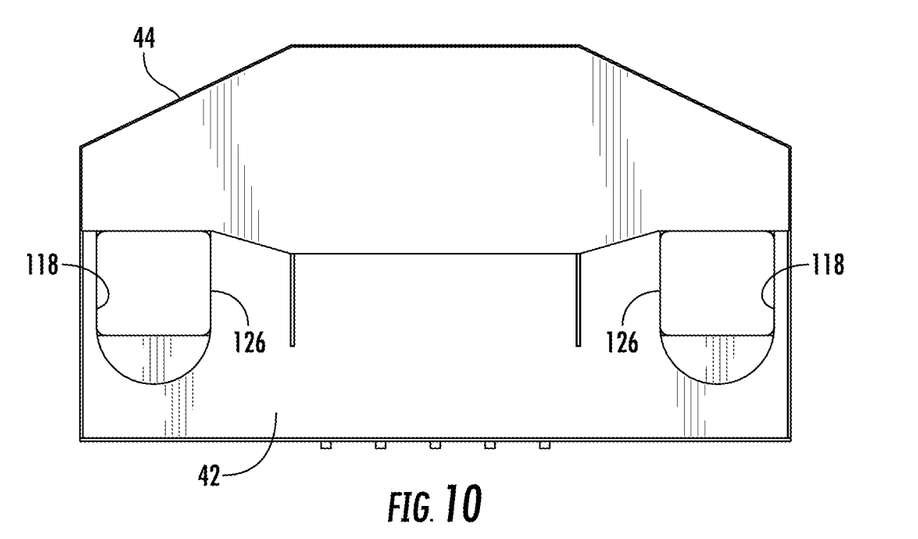
FIG. 10 is a bottom view of the counterweight box of FIG. 7.

Referring to FIGS. 4-6, parts of one of the air filtration units 106 are hidden for improved clarity. Each air filtration unit 106 further includes a filter chamber 134 disposed fluidly between the dirty air inlet 110 and the filtered air outlet 114, and a plurality of filter elements 138 positioned and housed within the filter chamber 134. In the illustrated embodiment, the filter elements 138 are cartridge-type cylindrical air filters with air-permeable filter media. In other embodiments, other types of filter elements 138 may be used. The filter elements 138 are configured such that dirty air enters the filter elements 138 in a radial direction of each filter element 138. Dirt is captured by the filter media and remains on an outer circumferential surface of each of the filter elements 138. After passing through the filter elements 138, the filtered air then enters a filtered air chamber 146, which is in fluid communication with the filtered air outlet 114. In other words, the filtered air chamber 146 is disposed fluidly between the filtered air outlet 114 and the filter chamber 134.

With reference to FIG. 5, the dirty air inlet 110 is positioned vertically below the filter chamber 134. Accordingly, the filter chamber 134 is positioned vertically above the dirty air inlet 110. In this way, the air filtration units 106 are upflow-type filter units. In other words, the dirty air enters the bottom of each unit 106, flows upwards (i.e., an upflow; in a vertical direction 158) to the filter chamber 134. In addition, the dirty air inlet 110 is positioned vertically below the filtered air outlet 114. For the purposes of this description, "vertically above" and "vertically below", and other similar directional terms refer to the orientation of the air filtration units 106 when mounted on the mining shovel 10, and above and below are in reference to the direction of Earth's gravity. The dirty air inlet 110 and the filter chamber 134 are preferably vertically aligned (i.e. a vertical plane intersects least a portion of the dirty air inlet 110 and at least a portion of the filter chamber 134), but the dirty air inlet 110 and the filter chamber 134 may be arranged in other ways that allow dirt to fall from the filter chamber 134 out through the dirty air inlet 110 under the influence of gravity. For example, the dirty air inlet 110 may be offset from the filter chamber 134 in a horizontal direction, while still being vertically below the filter chamber 134. In such embodiments, the dirty air inlet 110 and the filter chamber 134 may be connected by a sloped transition duct, for example.

Each air filtration unit 106 further includes a fan assembly 150 operable to generate an airflow from the dirty air inlet 110 to the filtered air outlet 114. Specifically, the fan assembly 150 is operable to draw dirty air through the opening 118 in the deck 42, into the dirty air inlet 110, through the filter elements 138 and out the filtered air outlet 114. In the illustrated embodiment, the fan assembly 150 includes a centrifugal blower 151 driven by an electric motor 152. The fan assembly 150 is supported above the filtered air chamber 146 by a stand 153 that is directly coupled to the deck 42. The stand 153 supports the weight of the fan assembly 150 to minimize stress on the remainder of the air filtration unit 106. A first air passageway or duct 154 extends between the filtered air chamber 146 and an inlet of the centrifugal blower 151, and a second air passageway or duct 155 extends between an outlet of the centrifugal blower 151 and the filtered air outlet 114 (FIG. 5). One or both of the ducts 154, 155 may be flexible to facilitate alignment during assembly. Flexible ducts 154, 155 may also advantageously minimize vibration transfer between the main housing 38 and the air filtration units 106, and between the fan assembly 150 and the filtered air chamber 146. In some embodiments, either or both of the fan assemblies 150 may be mounted directly to the main housing 38 (e.g., to the rear wall 130). In such embodiments, the duct 154 may be extended to connect the inlet of the centrifugal blower 151 to the filtered air chamber 146.

With continued reference to FIG. 5, in the illustrated embodiment, each air filtration unit 106 further includes a filter cleaning mechanism 141. The filter cleaning mechanism 141 includes an air-manifold 142 that stores a quantity of pressurized air and that can release a burst of pressurized air (e.g., via the actuation of one or more solenoid valves)

through each of the filter elements 138. The burst of pressurized air is preferably directed opposite to the direction of operating airflow through the filter elements 138 so as to dislodge dirt captured by the filter elements 138. The filter cleaning mechanism 141 may be operated on a timer so as to send bursts of pressurized air to the filter elements 138 at set intervals (e.g., 30 second intervals). The filter cleaning mechanism 141 may alternatively be operated based on measurements (e.g., pressure readings), in response to operator command, or in response to a change in operating condition, such as when the fan assembly 150 is turned off. In the illustrated embodiment, a filter change indicator 147 is provided on the air filtration unit 106. The filter change indicator 147 provides a visual indication to the operator that one or more of the filter elements 138 requires servicing or replacement. In some embodiments, the filter change indicator 147 may be a pressure gauge configured to measure a pressure drop across the filter elements 138. In other embodiments, a variety of other indicators may be used.

In operation, the fan assembly 150 is energized to generate an airflow through the air filtration unit 106. In particular, dirty air is drawn upward through the opening 118 in the deck 42, and the dirty air accelerates as it approaches the dirty air inlet 110 of the air filtration unit 106. The dirty air then flows vertically (i.e., upward, in the direction of arrow 158) toward the filter chamber 134 where the dirt is collected on the surfaces of the filter elements 138 as the air flows through the filter media. The filtered air enters the filtered air chamber 146, and the fan assembly 150 then expels the filtered air through the filtered air outlet 114 and into the main housing 38.

The air filtration unit 106 may operate in a filter cleaning mode, in which the air manifold 142 provides a burst of pressurized air to the filter elements 138 to dislodge any debris from the filter elements 138. Smaller particles of debris may remain suspended within the filter chamber 134 and remain in the airflow, causing the small particles of debris to again become lodged on the filter elements 138. However, larger particles of debris will drop downwards, back through the dirty air inlet 110. In other words, the dirty air inlet 110 can also be considered a dirt outlet, since the filtered dirt is discharged through the dirty air inlet 110 when the air filtration unit 106 operates in the filter cleaning mode. The burst of air from the manifold 142 causes the large particles of debris to exit the filter chamber 134 via gravity. Any smaller particles that remained suspended in the filter chamber 134 will conglomerate and increase in size until they are large enough in size to drop through the dirty air inlet 110 and the opening 118 without become re-entrained in the airflow generated by the fan assembly 150. The air filtration unit 106 may also continue operating in the filter cleaning mode for a period of time after the fan assembly 150 is shut off. As such, the manifold will continue to deliver bursts of air, and the dislodged dirt and debris may fall away from the filter elements 138 without becoming re-entrained in the airflow generated by the fan assembly 150. In some embodiments, the air filtration unit 106 may automatically continue operating in the filter cleaning mode for a predetermined time period when the shovel 10 ceases operations.

With reference to FIG. 2, in some embodiments, the main housing 38 may include a wall or curtain 162 that separates the main housing 38 into two compartments 38A, 38B. The two compartments 38A, 38B can be individually temperature controlled by operating at least one of the two air filtration units 106 with a variable frequency drive. In this way, when the outside temperature is very cold, for example, the air filtration unit 106 can be operated to limit the amount of cold air brought into the main housing 38. Specifically, if one compartment 38A has different temperature requirements based on housing different components than the compartment 38B, the air filtration unit 106 that corresponds to the compartment 38A can be controlled with a variable frequency drive while the other air filtration unit 106 that corresponds to the compartment 38B can be operated normally. In other words, the power supplied to the blower 151 of the air filtration unit 106 that corresponds to the compartment 38A can be varied independently of the power supplied to the blower 151 of the other air filtration unit 106 in order to maintain a target temperature within the compartment 38A. Various components, such as electronics, may have critical temperature ranges for proper operation, and operating the air filtration units 106 with a variable frequency drive is one way to adjust the blower fan speed to create a temperature controlled main housing 38, or a temperature controlled compartment 38B of the main housing 38.

Figure 11:
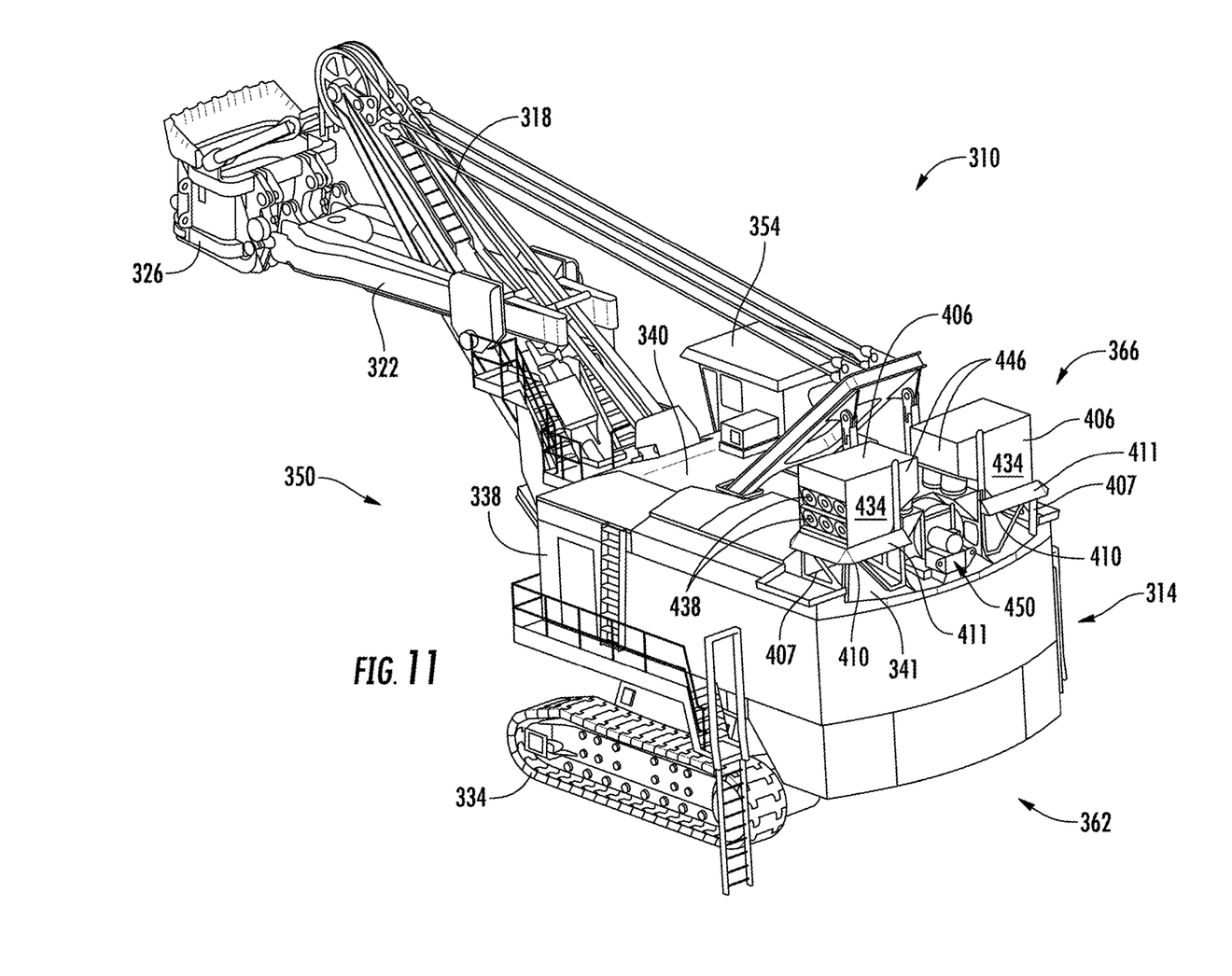
FIG. 11 is a perspective view of a mobile mining machine according to another embodiment of the invention.
Figure 12:
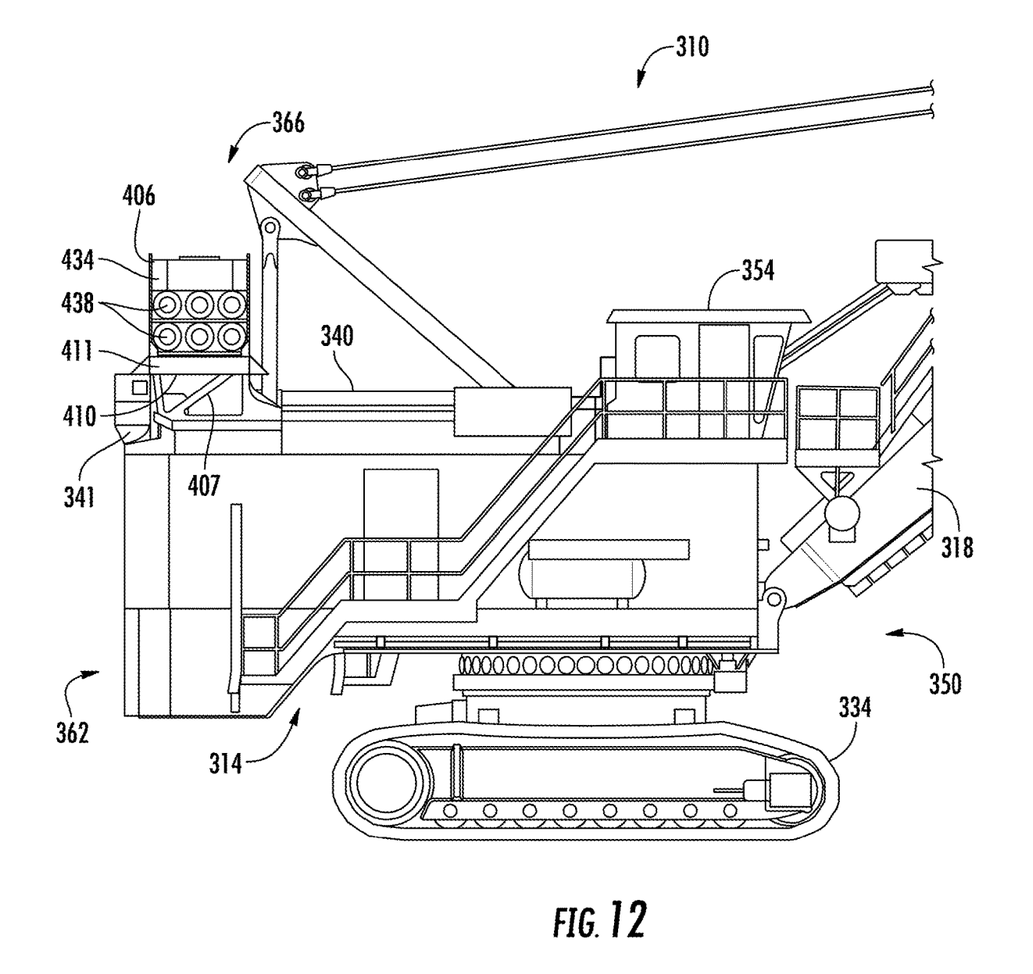
FIG. 12 is a partial side view of the mobile mining machine of FIG. 11.
Figure 13:
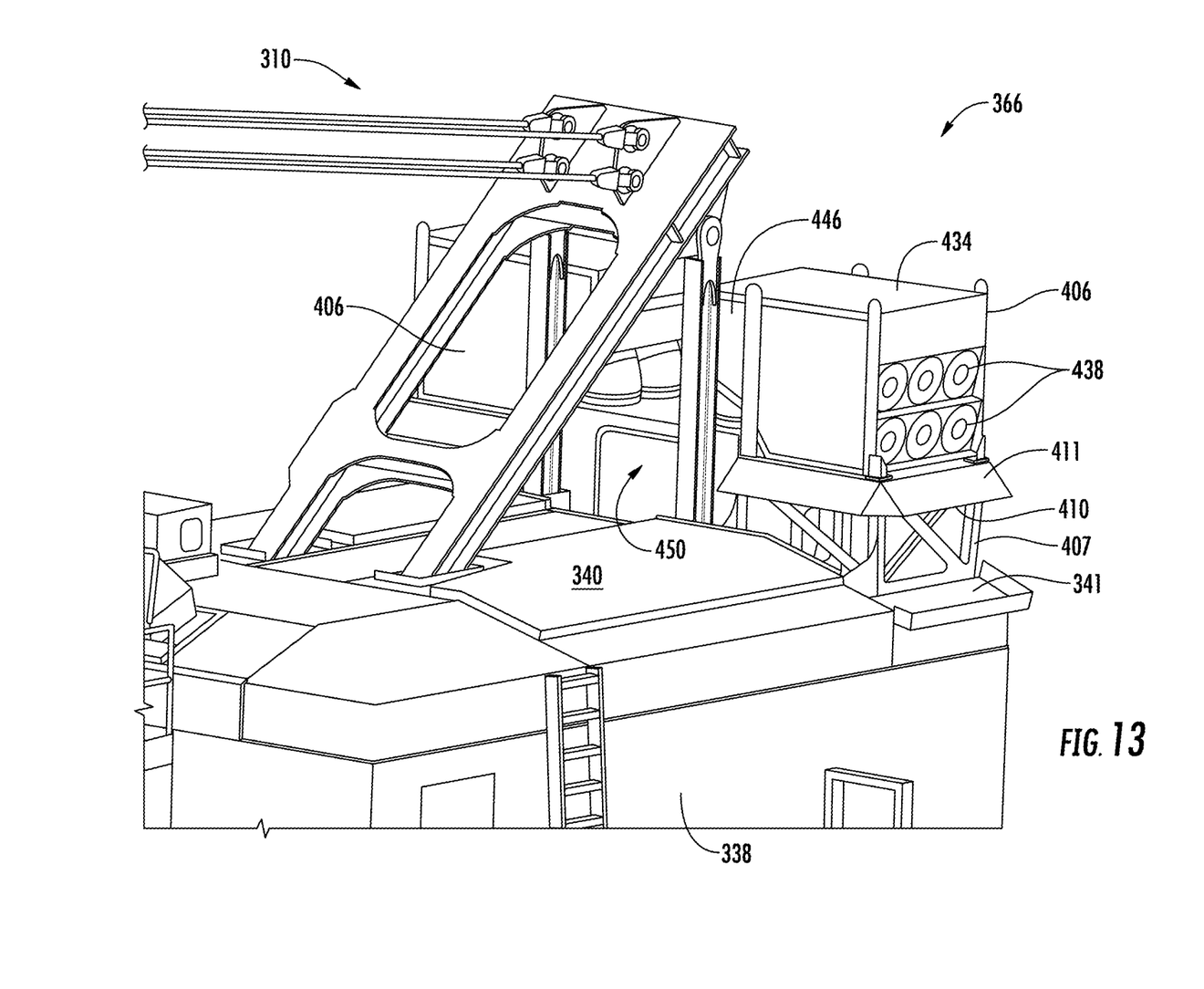
FIG. 13 is a partial perspective view of an air filtration assembly for the mobile mining machine of FIG. 11.

With reference to FIGS. 11-13, a mining shovel 310 according to another embodiment is illustrated. The shovel 310 is similar to the shovel 10, and only the differences are described herein, with similar structure referenced with the same reference numerals incremented by "300" (e.g., 18 and 318 both reference the boom, etc.). The mining shovel 310 includes a base 314, a boom 318, a first member or handle 322, and a bucket 326. In the illustrated embodiment, an air filtration assembly 366 is coupled to a roof 340 of a main housing 338. In particular, the air filtration assembly 366 includes two air filtration units 406 positioned on open air stands 407. In the illustrated embodiment, the air filtration units 406 share a common fan assembly 450. As before, the air filtration units 406 are upflow-type filter units where the dirty air flows vertically upwards from a dirty air inlet 410 to a filter chamber 434. In the illustrated embodiment, each of the air filtration units 406 include a skirt 411 that surrounds the dirty air inlet 410, which helps prevent rain or water from entering the air filtration units 406.

The roof 340 includes angled portions 341 positioned beneath the dirty air inlets 410. Similar to the air filtration units 106, the air filtration units 406 can operate in a filter cleaning mode, which expels the collected dirt through the dirty air inlet 410, with a burst of pressurized air. The angled portions 341 of the roof 340 divert the dispelled dirt away from the shovel 310. In other embodiments, any dirt that collects on the roof 340 is washed away during rain storms (i.e., weather), or is otherwise manually removed by an operator.

Figure 14:
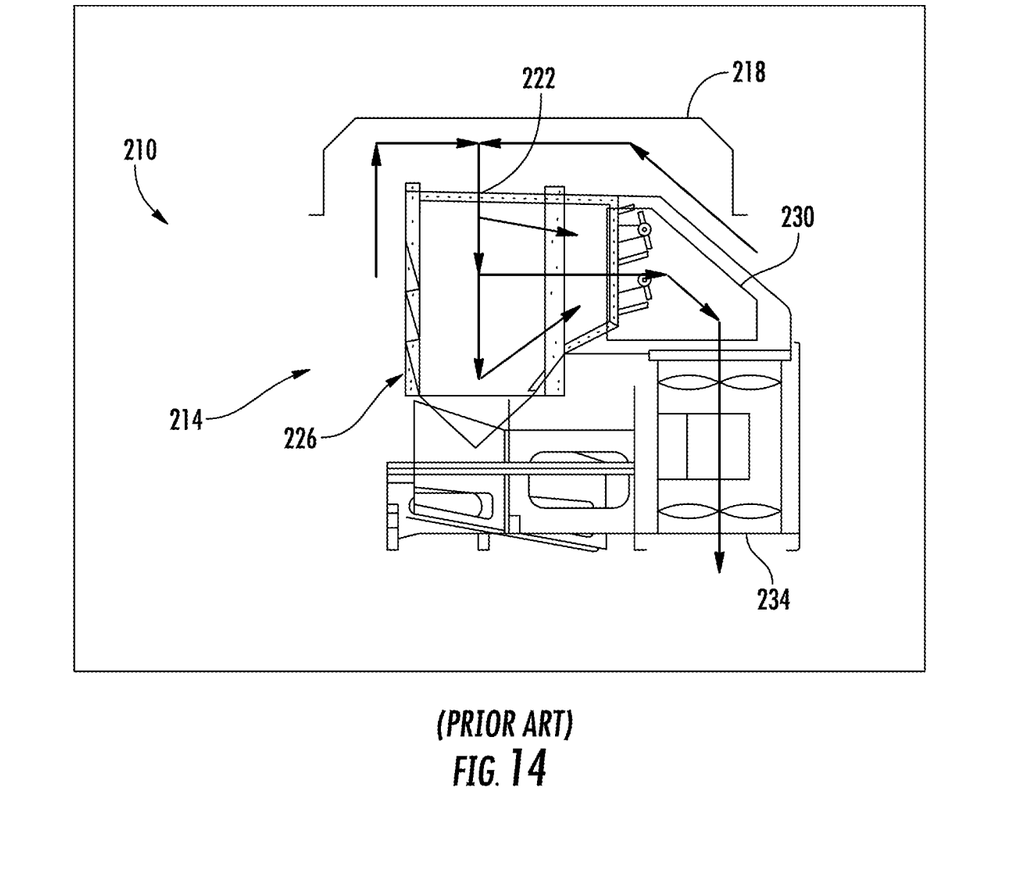
FIG. 14 is a schematic of a conventional air filtration system for a mobile mining machine.
Figure 15:
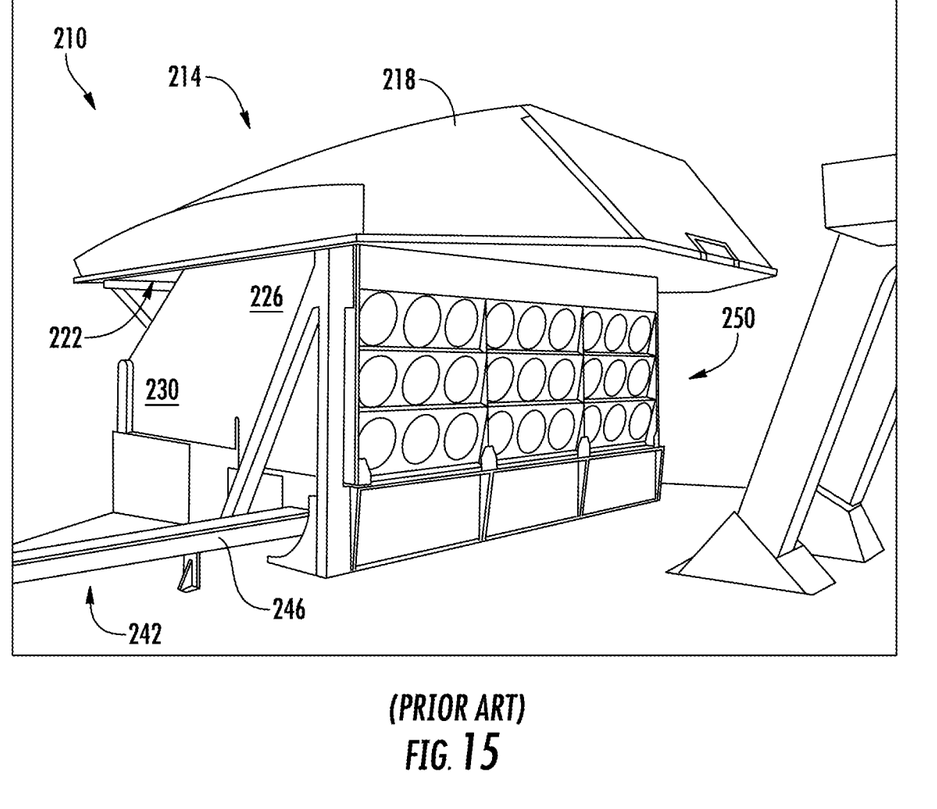
FIG. 15 is a perspective view of the convention air filtration system of FIG. 14.
Figure 16:
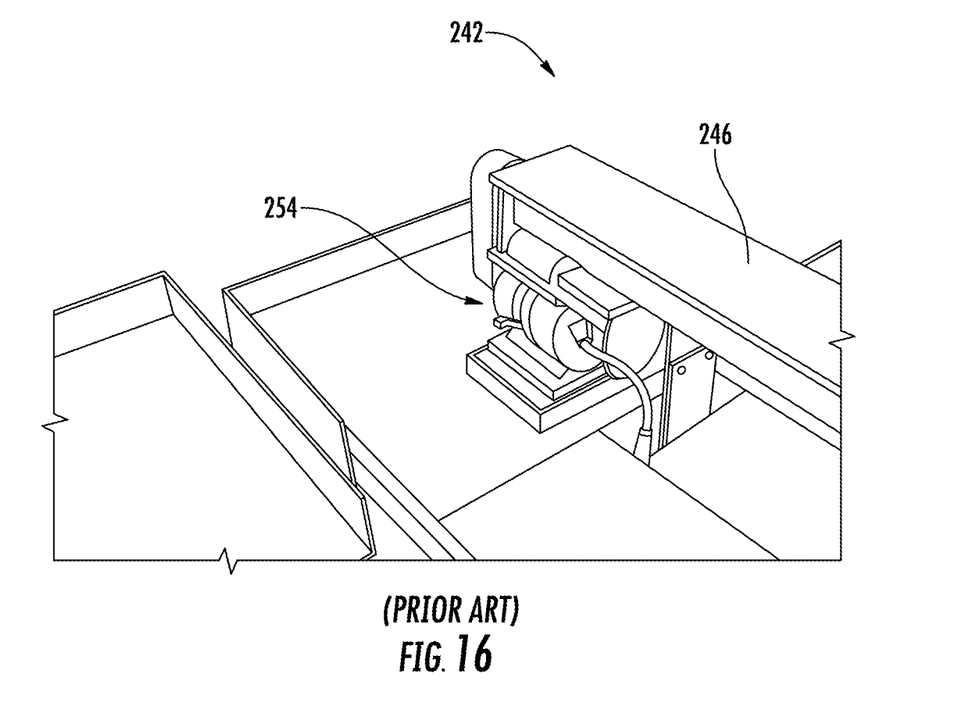
FIG. 16 is a perspective view of a dirt removal assembly of the convention air filtration system of FIG. 14.

With reference to FIGS. 14-16, a conventional air filtration assembly 210 for a mining shovel is shown utilizing a conventional downflow air filtration unit 214. In particular, the downflow air filtration unit 214 includes a roof that defines an inlet hood 218, a dirty air inlet 222, a filter chamber 226, a filtered air chamber 230, and a filtered air outlet 234 (FIG. 14). Downflow-type air filtration units 214 passes from the inlet hood 218 to the dirty air inlet 22 in a downward direction. Since the dirty air inlet 222 is oriented upwards, the inlet hood 218 is required to prevent rain or water from entering the dirty air inlet 222. In addition, the downflow air filtration unit 214 must be mounted on a roof 238 of the mining shovel due to sizing constraints and air flow requirements.

With continued reference to FIGS. 14-16, in the downflow-type air filtration unit 214, the dirt collected in the filter chamber 226 is removed with a separate dirt removal assembly 242. The dirt removal assembly 242 includes an auger 246, a drive motor (not shown, but on side 250) to drive the auger 246, and an air lock 254 (FIG. 16) to dispel the dirt. The dirt removal assembly 242 adds additional cost and complexity and the additional components increase maintenance and potential failure points. In contrast, the upflow air filtration units 106, 406 described above do not require such a dirt removal assembly since collected dirt simply falls back through the dirty air inlets 110, 410 under the influence of gravity.

Thus, the upflow air filtration units 106, 406 offer multiple advantages over the conventional downflow air filtration unit 214. For example, first, the upflow air filtration units 106, 406 do not require an additional hood to prevent water from entering. Second, as explained above, the upflow air filtration units 106, 406 do not require a dirt removal assembly to transport the collected dirt away from the filter chamber 134, 434. Instead, the collected dirt simply falls back through the dirty air inlet 110, 410 when the upflow air filtration unit 106, 406 is operated in a filter cleaning mode.

Various features of the invention are set forth in the following claims.

What is claimed is:

1. A mobile mining machine comprising:
   a base;
   a boom coupled to the base;
   a shovel supported by the boom;
   a main housing supported on the base, the main housing at least partially enclosing a hoist motor; and
   an air filtration unit configured to provide filtered air to the main housing, the air filtration unit including
     a dirty air inlet,
     a filtered air outlet, and
     a filter chamber disposed fluidly between the dirty air inlet and the filtered air outlet, the filter chamber housing a filter element,
   wherein the dirty air inlet is positioned vertically below the filter chamber;
   wherein the base includes a deck;
   wherein the main housing encloses at least a portion of the deck;
   wherein the air filtration unit is positioned on the deck; and
   wherein the deck includes an opening in fluid communication with the dirty air inlet.

2. The mobile mining machine of claim 1, wherein the air filtration unit further includes a fan assembly operable to generate an airflow from the dirty air inlet to the filtered air outlet.

3. The mobile mining machine of claim 2, wherein the air filtration unit further includes a filtered air chamber disposed fluidly between the filtered air outlet and the filter chamber, and a stand that supports the fan assembly above the filtered air chamber.

4. The mobile mining machine of claim 2, wherein the air filtration unit includes a manifold configured to supply a burst of pressurized air to the filter element in a direction opposite the airflow.

5. The mobile mining machine of claim 1, wherein dirt collected by the filter element is dischargeable through the dirty air inlet.

6. The mobile mining machine of claim 1, wherein the air filtration unit is positioned outside of the main housing.

7. The mobile mining machine of claim 1, wherein the deck includes a counterweight box, and wherein the air filtration unit is positioned on the counterweight box.

8. The mobile mining machine of claim 1, wherein the main housing includes a roof, and wherein the air filtration unit is positioned on the roof.

9. The mobile mining machine of claim 8, wherein the roof includes an angled portion positioned vertically below the dirty air inlet, and wherein dirt collected by the filter element is dischargeable through the dirty air inlet and on to the angled portion under the influence of gravity.

10. The mobile mining machine of claim 1,
    wherein the air filtration unit is a first air filtration unit,
    wherein the mobile mining machine further comprises a second air filtration unit configured to provide filtered air to the main housing,
    wherein each of the first and second air filtration units includes a fan assembly operable to generate an airflow, and
    wherein the fan assembly of the first air filtration unit is controllable independently of the fan assembly of the second air filtration unit.

11. A method of operating an air filtration unit for a mobile mining machine, the method comprising:
    drawing air into the air filtration unit through a dirty air inlet;
    capturing dirt from the air on a filter element;
    expelling filtered air through a filtered air outlet;
    supplying the filtered air into a main housing of the mobile mining machine, the main housing at least partially enclosing at least one selected from the group consisting of: an air compressor, a hoist motor, an electric drive, a collector, a swing transmission, and a lubricant tank; and
    discharging at least a portion of the dirt captured on the filter element through the dirty air inlet;
    wherein discharging includes shutting off a fan assembly of the air filtration unit and dislodging dirt from the filter element with a burst of pressurized air such that the dislodged dirt falls away from the filter element and through the dirty air inlet under the influence of gravity.

12. The method of claim 11, wherein the filter element is positioned vertically above the dirty air inlet.

13. The method of claim 11, wherein the air filtration unit is positioned on a roof of the main housing.

14. The method of claim 11, wherein drawing air into the air filtration unit includes drawing air through an opening in a deck of the mobile mining machine.

15. The method of claim 11, wherein the air filtration unit is positioned on a counterweight box of the mobile mining machine.

16. A mobile mining machine comprising:
    a base;
    a boom coupled to the base;
    a shovel supported by the boom;
    a main housing supported on the base, the main housing at least partially enclosing a hoist motor; and
    an air filtration unit configured to provide filtered air to the main housing, the air filtration unit including
      a dirty air inlet,
      a filtered air outlet, and
      a filter chamber disposed fluidly between the dirty air inlet and the filtered air outlet, the filter chamber housing a filter element,
      wherein the dirty air inlet is positioned vertically below the filter chamber;
    wherein the main housing includes a roof, and wherein the air filtration unit is positioned on the roof;
    wherein the roof includes an angled portion positioned vertically below the dirty air inlet; and
    wherein dirt collected by the filter element is dischargeable through the dirty air inlet and on to the angled portion under the influence of gravity.

17. A method of operating an air filtration unit for a mobile mining machine, the method comprising:
- drawing air into the air filtration unit through a dirty air inlet;
- capturing dirt from the air on a filter element;
- expelling filtered air through a filtered air outlet;
- supplying the filtered air into a main housing of the mobile mining machine, the main housing at least partially enclosing at least one selected from the group consisting of: an air compressor, a hoist motor, an electric drive, a collector, a swing transmission, and a lubricant tank; and
- discharging at least a portion of the dirt captured on the filter element through the dirty air inlet;
- wherein drawing air into the air filtration unit includes drawing air through an opening in a deck of the mobile mining machine.

* * * * *